United States Patent [19]

Boffardi et al.

[11] Patent Number: 5,182,028

[45] Date of Patent: Jan. 26, 1993

[54] MONOFLUOROPHOSPHATE FOR CALCIUM CARBONATE SCALE CONTROL AND IRON AND MANGANESE STABILIZATION

[75] Inventors: Bennett P. Boffardi, Bethel Park; Ann M. Sherbondy, Pittsburgh, both of Pa.

[73] Assignee: Calgon Corporation, Pittsburgh, Pa.

[21] Appl. No.: 676,625

[22] Filed: Mar. 28, 1991

[51] Int. Cl.$^5$ .................................... C02F 5/08
[52] U.S. Cl. ........................ 210/697; 252/175; 252/181
[58] Field of Search .................. 210/696–701, 210/753; 252/175, 180, 181

[56] References Cited

U.S. PATENT DOCUMENTS

| | | | |
|---|---|---|---|
| 2,358,222 | 9/1944 | Fink et al. | 210/22 |
| 2,539,305 | 10/1951 | Hatch | 210/23 |
| 2,783,200 | 2/1957 | Crum et al. | 210/701 |
| 2,980,610 | 4/1961 | Ruchrwein | 210/701 |
| 3,285,886 | 11/1966 | Gunderson et al. | 210/701 |
| 3,349,031 | 10/1967 | Hatch et al. | 210/50 |
| 3,434,969 | 3/1969 | Ralston | 210/700 |
| 3,463,730 | 8/1969 | Booth et al. | 210/701 |
| 3,514,476 | 5/1970 | Morita | 260/429.9 |
| 3,518,204 | 6/1970 | Hansen, Jr. et al. | 210/701 |
| 3,887,482 | 6/1975 | Hellestam et al. | 210/752 |
| 3,928,196 | 12/1975 | Persinski et al. | 210/701 |
| 3,965,027 | 6/1976 | Boffardi et al. | 252/180 |
| 4,452,713 | 6/1984 | Small | 210/697 |
| 4,552,665 | 11/1985 | Ralston et al. | 210/701 |
| 4,561,981 | 12/1985 | Characklis | 210/696 |
| 4,613,450 | 9/1986 | Moran et al. | 252/181 |
| 4,640,793 | 2/1987 | Persinski et al. | 210/697 |
| 4,936,987 | 6/1990 | Persinski et al. | 210/699 |
| 4,941,979 | 7/1990 | Kessler | 210/697 |
| 5,076,941 | 12/1991 | Boffardi et al. | 210/753 |

*Primary Examiner*—Peter Hruskoci
*Attorney, Agent, or Firm*—Raymond M. Speer; Charles M. Caruso

[57] ABSTRACT

Monofluorophosphate salts, especially sodium monofluorophosphate ($Na_2PO_3F$), when added to various industrial water systems in concentrations between 0.1 mg/L and 50 mg/L, significantly reduce the amount of calcium carbonate scale which is formed on heat exchange and other metallic surfaces of such systems.

Monofluorophosphate salts, especially sodium monofluorophosphate, when added to various water systems in concentrations between 0.1 mg/L and 50 mg/L also stabilizes soluble manganese ion and its reaction products, i.e., primarily $MnO_2$, in desirable forms and reduced particle sizes.

Monofluorophosphate salts, especially sodium monofluorophosphate, when added to various water systems in concentrations between 1 mg/L and 500 mg/L also stabilizes soluble iron ion and its reaction products, i.e., primarily $Fe_2O_3$.

12 Claims, No Drawings

MONOFLUOROPHOSPHATE FOR CALCIUM CARBONATE SCALE CONTROL AND IRON AND MANGANESE STABILIZATION

BACKGROUND OF THE INVENTION

1. Field of the Invention

CALCIUM CARBONATE SCALE INHIBITION—The present invention relates to the use of monofluorophosphate salts, especially sodium monofluorophosphate ($Na_2PO_3F$), in a method of inhibiting the formation of calcium carbonate ($CaCO_3$) scale deposits on metallic surfaces of water-carrying systems. Generally, calcium carbonate scale deposits are incrustation coatings which accumulate on the metallic surfaces of a water-carrying system through a number of different causes.

Various industrial and commercial water-carrying systems are subject to calcium carbonate scale formation problems. Calcium carbonate scale is of particular concern in heat exchange systems employing water, such as, for example, boiler systems, and once-through and open recirculating water cooling systems.

The water employed in these systems ordinarily will contain a number of dissolved salts, and the alkaline earth metal cation calcium is usually prevalent, as is the anion carbonate. The combination product of calcium cation and carbonate anion will precipitate from the water in which they are carried to form scale deposits when the concentration of the anion and cation comprising the reaction product, i. e., calcium carbonate, exceeds the solubility of the reaction product itself. Thus, when the concentrations of calcium ion and carbonate ion exceed the solubility of the calcium carbonate reaction product, a solid phase of calcium carbonate will form as a precipitate. Precipitation of the reaction product will continue until the solubility product concentrations of the constituent ions are no longer exceeded.

Numerous factors may be responsible for producing a condition of supersaturation for the reaction product calcium carbonate. Among such factors are changes in the pH of the water system, evaporation of the water phase, rate of heat transfer, amount of dissolved solids, and changes in the temperature or pressure of the system.

For boiler systems and similar heat exchange systems including cooling towers, the mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. As a result, the solubility of the scale-forming calcium carbonate salt reaction product is first exceeded in this thin film, and crystallization of calcium carbonate scale results directly on the heating or heat exchange surface.

In addition to this, a common source of scale in boiler systems is the breakdown of calcium bicarbonate to form calcium carbonate, water and carbon dioxide under the influence of heat. For open recirculating cooling water systems, in which a cooling tower, spray pond, evaporative condenser, and the like serve to dissipate heat by evaporation of water, the chief factor which promotes calcium carbonate scale formation is concentration of solids dissolved in the water by repeated evaporation of portions of the water phase. Thus, even a water which is not scale forming on a once-through basis usually will become scale forming when concentrated two, four, or six times.

The formation of calcium carbonate scale deposits poses a serious problem in a number of regards. The calcium carbonate scale which is formed possesses a low degree of heat conductivity. Thus, a calcium carbonate scale deposit is essentially an insulating layer imposed across the path of heat travel from whatever source to the water of the system. In the case of a boiler system, the retarded heat transfer causes a loss in boiler efficiency. Increased input of heat to compensate for this loss results in overheating of the boiler metal and consequent tube failures. In addition to this problem, calcium carbonate scale formation facilitates corrosive processes, and a substantial calcium carbonate scale deposit will interfere materially with fluid flow. Consequently, calcium carbonate scale is an expensive problem in many industrial water systems, causing delays and shutdowns for cleaning and removal.

STABILIZATION OF SOLUBLE MANGANESE AND ITS REACTION PRODUCTS—The present invention further relates to the use of monofluorophosphate salts, especially sodium monofluorophosphate ($Na_2PO_3F$), to stabilize soluble manganese ion and its reaction products in desirable forms and reduced particle sizes. Manganous ions are often found in well waters while cooling waters contain primarily the manganic species. Anionic species of carbonate, bicarbonate, sulfite, fluoride, chloride, sulfate, and so forth, and dissolved oxygen may be present in both waters. Oxygen reaction products of manganese and iron can collect on metal surfaces and accelerate corrosion and reduce heat transfer.

Oxidation leads to precipitation of dark brown or black hydrous oxides or hydroxides of the higher oxidation states of manganese which are very insoluble. When these precipitates remain suspended in the water, they cause objectionable discoloration known as "black water"; when they settle out, black deposits form which can block lines, or act as catalysts causing further manganese deposition. These deposits are very deleterious in textile and laundry operations as they interfere with dying processes and leave spots which are difficult to remove. They appear to increase the corrosion of copper. They are also troublesome in municipal water distribution systems where their presence makes it extremely difficult to maintain a chlorine residual.

The monofluorophosphate salts, especially sodium monofluorophosphate ($Na_2PO_3F$), when used in accordance with the method of the present invention, can keep the reaction products of manganese described above in colloidal/fine dispersed form rather than the normal flocculant, adherent species. The manganese thus remains soluble so that it will not form particles which will precipitate out of solution and form scale.

STABILIZATION OF SOLUBLE IRON AND ITS REACTION PRODUCTS—The present invention still further relates to the use of monofluorophosphate salts, especially sodium monofluorophosphate ($Na_2PO_3F$), to stabilize soluble iron ion and its reaction products in desirable forms and reduced particle sizes. Ferrous and ferric ions are often found in well waters while cooling waters contain primarily the ferric species. Anionic species of carbonate, bicarbonate, sulfite, fluoride, chloride, sulfate, and so forth, and dissolved oxygen may be present in both waters. Oxygen reaction products of iron can collect on metal surfaces and accelerate corrosion and reduce heat transfer.

Oxidation leads to precipitation of brown or red oxides of the higher oxidation states of iron which are insoluble. When these precipitates remain suspended in the water, they cause objectionable discoloration known as "red water"; when they settle out, red deposits form which can block lines, or act as catalysts causing further iron reaction product deposition. These deposits are very deleterious in textile and laundry operations as they interfere with dying processes and leave spots which are difficult to remove. They are also troublesome in municipal water distribution systems where their presence makes it extremely difficult to maintain a chlorine residual.

The monofluorophosphate salts, especially sodium monofluorophosphate ($Na_2PO_3F$), when used in accordance with the method of the present invention, can keep the reaction products of iron described above in colloidal/fine dispersed form rather than the normal flocculant, adherent species. The iron thus remains soluble so that it will not form particles which will precipitate out of solution and form scale.

2. Brief Description of the Prior Art

Early efforts to reduce scale formation in water-carrying systems employed compounds such as tannins, modified lignins, algins, and other similar materials. Chelating or sequestering agents have also been employed to prevent precipitation or crystallization of scale-forming calcium carbonate. Another type of agent which has been actively explored heretofore as a calcium carbonate scale inhibiting material is the threshold active inhibitor. Such materials are effective as scale inhibitors in amounts considerably less than that stoichiometrically required, and this amount is termed the threshold amount. Inorganic polyphosphates have long been used as such threshold active inhibitors. For examples of such materials, see Fink—U.S. Pat. No. 2,358,222; Hatch—U.S. Pat. No. 2,539,305; and Ralston U.S. Pat. No. 3,434,969. Certain water soluble polymers, including groups derived from acrylamide and acrylic acid have been used to condition water containing scale-forming calcium cargonate. For example, see U.S. Pat. No. 2,783,200; 3,514,476; 2,980,610; 3,285,886; 3,463,730; 3,518,204; 3,928,196; 3,965,027 and 4,936,987.

Methods which have been used heretofore to remove manganese include those whereby the manganous ion is oxidized to insoluble higher oxides, hydrous oxides, or hydroxides, which precipitate and may be removed by coagulation and settling, filtration, or both. The oxidation has also been effected by raising the pH of the water to 8 or higher where naturally occurring dissolved oxygen or mechanical aeration brings about oxidation, or by the use of chlorine or permanganate. All of these methods, however, suffer from obvious disadvantages which limit their usefulness and effectiveness. For example, the use of a high pH to facilitate oxidation by dissolved oxygen is expensive and tends to cause scale deposition. Chlorine is only slightly more active than dissolved oxygen for oxidation of manganese and also requires pH elevation. Permanganate is expensive and imparts to the water an intense color that may be unacceptable.

One method for removing the manganese by precipitation and removal involves the addition of a salt of iron, copper, or cobalt and any compound yielding bisulfite ions in solution to the manganese-containing water. See Hatch—U.S. Pat. No. 3,349,031.

Soluble manganese ion and its reaction products have been stabilized in water systems using carboxylic acid/sulphonic acid copolymers. See Ralston—U.S. Pat. No. 4,552,665.

Moran et al., U.S. Pat. No. 4,613,450 discloses corrosion inhibitors comprising members of the fluorophosphate family, including sodium monofluorophosphate. However, these are said to be useful for protecting metallic surfaces of installations and devices using water as energetic or thermic fluid, i.e., for heating and cooling. The only metals which are mentioned are iron and its alloys, particularly galvanized steel, copper and its alloys, and aluminum and its alloys.

Sodium monofluorophosphate is the most widely accepted dentifrice additive to reduce dental decay. In aqueous solution as well as in a paste, it has been reported to be effective in treating sensitive teeth.

SUMMARY OF THE INVENTION

The present invention relates to a method of inhibiting calcium carbonate scale formation in an aqueous system comprising the step of treating said system with an effective scale-inhibiting amount of a monofluorophosphate salt. In particular, the present invention relates to such a treatment method in which sodium monofluorophosphate is used in an amount sufficient to achieve a concentration of from 0.1 to 50 mg/L in said aqueous system, preferably from 1.0 to 10 mg/L, and most preferably from 2 to 5 mg/L.

The present invention further relates to a method of inhibiting the precipitation of dissolved manganese ion and its reaction products in an aqueous system, comprising the step of treating said system with an effective precipitation-inhibiting amount of a monofluorophosphate salt. In particular, the present invention relates to such a treatment method in which sodium monofluorophosphate is used in an amount sufficient to achieve a concentration of from 0.1 to 50 mg/L in said aqueous system, preferably from 1.0 to 10 mg/L, and most preferably from 2 to 5 mg/L.

The present invention still further relates to a method of inhibiting the precipitation of dissolved iron ion and its reaction products in an aqueous system, comprising the step of treating said system with an effective precipitation-inhibiting amount of a monofluorophosphate salt. In particular, the present invention relates to such a treatment method in which sodium monofluorophosphate is used in an amount sufficient to achieve a concentration of from 1 to 500 mg/L in said aqueous system, preferably from 2 to 100 mg/L, and most preferably from 5 to 50 mg/L.

The present invention also relates to a method of inhibiting calcium carbonate scale formation, and inhibiting the precipitation of dissolved manganese and iron ions and their reaction products in an aqueous system which is a potable water source while at the same time providing anticaries effective fluoride in said water, comprising treating said water with an effective amount of sodium monofluorophosphate. In particular, the present invention relates to such a treatment method in which the amount of sodium monofluorophosphate is sufficient to achieve a concentration of 0.1 to 500 mg/L, and preferably 1 to 50 mg/L in the potable water source.

DETAILED DESCRIPTION OF THE INVENTION

The monofluorophosphates useful in the methods of the present invention all have $PO_3F^{-2}$ as the anion portion of the total salt. This is the active ionic component with respect to providing the benefits of the methods of the present invention in inhibiting calcium carbonate scale formation, and inhibiting the precipitation of manganese and iron ions and their reaction products, and also providing anticaries effective fluoride in said water. The cation portion of the total salt is relatively unimportant, except with respect to solubility, which, it will be appreciated, is critical to the method of the present invention, since it requires the addition of the monofluorophosphate salt to an aqueous system being treated, including a potable water source. Thus, the most soluble salt forms will generally be the most preferred for use in the methods of the present invention.

The cation portion is selected from the alkali metals Li, Na, K and $NH_4$, the alkaline earth metals Mg, Ca and Ba, or combinations of these. Since the $PO_3F^{-2}$ anion portion has a $-2$ valency, the most common alkali metal salt forms will simply have two cations of the same metal, e.g., $Na_2PO_3F$, which is the most soluble and the most preferred form for use in the method of the present invention. The alkali metals may be different, e.g., $LiNaPO_3F$ or $NaKPO_3F$. Where the alkaline earth metals are present, only one is necessary because they have a $+2$ valency. Thus, $MgPO_3F$ may be used. Combinations of the alkali and alkaline earth metals are possible, e.g., $Na_2Mg(PO_3F)_2$, but these are less preferred forms.

The most preferred monofluorophosphate for use in the method of the present invention, sodium monofluorophosphate, is a stable, white, finely divided solid which melts at about 625° C. with slow decomposition or hydrolysis. It is soluble in water: 42 g per 100 g saturated solution at 25° C. Dilute solutions are stable indefinitely. Accordingly, such a material can be added directly to an aqueous system to be treated, including a potable water source in the amount required to inhibit calcium carbonate scale formation, and inhibit precipitation of manganese and iron ions and their reaction products, as well as to provide fluoride to achieve an anticaries effect.

The amounts of any particular monofluorophosphate salt, especially sodium monofluorophosphate, that are required to be added for the desired maximum inhibition of calcium carbonate scale formation will be such as to provide an ultimate concentration in the aqueous system being treated of between 0.1 and 50 mg/L, and preferably this concentration will be between 1.0 and 10 mg/L. Most preferably the concentration will be between 2 and 5 mg/L, although it is understood that many factors, of the type which have been explained in detail with regard to the background to the present invention, will determine the actual amount of sodium monofluorophosphate which will be added to any particular aqueous system in order to achieve the maximum amount of inhibition of calcium carbonate scale formation in that aqueous system. The calculation of those amounts will be well within the skill of the artisan in this field.

The amounts of any particular monofluorophosphate salt, especially sodium monofluorophosphate, that are required to be added for the desired maximum inhibition of precipitation of manganese ion and its reaction products will be such as to provide an ultimate concentration in the aqueous system being treated of between 0.1 and 50 mg/L, and preferably this concentration will be between 1.0 and 10 mg/L. Most preferably the concentration will be between 2 and 5 mg/L, although it is understood that many factors, of the type which have been explained in detail with regard to the background to the present invention, will determine the actual amount of sodium monofluorophosphate which will be added to any particular aqueous system in order to achieve the maximum amount of inhibition of precipitation of manganese ion and its reaction product in that aqueous system. The calculation of those amounts will be well within the skill of the artisan in this field.

The amounts of any particular monofluorophosphate salt, especially sodium monofluorophosphate, that are required to be added for the desired maximum inhibition of precipitation of iron ion and its reaction products will be such as to provide an ultimate concentration in the aqueous system being treated of between 1 and 500 mg/L, and preferably this concentration will be between 2 and 100 mg/L. Most preferably the concentration will be between 5 and 50 mg/L, although it is understood that many factors, of the type which have been explained in detail with regard to the background to the present invention, will determine the actual amount of sodium monofluorophosphate which will be added to any particular aqueous system in order to achieve the maximum amount of inhibition of precipitation of iron ion and its reaction product in that aqueous system. The calculation of those amounts will be well within the skill of the artisan in this field.

The amounts of any particular monofluorophosphate salt, especially sodium monofluorophosphate, that are required to be added to a potable water source for the desired maximum inhibition of calcium carbonate scale formation, and inhibition of precipitation of manganese and iron ions and their reaction products, will not be such as to provide the extent of anticaries effect that is normally desired when water is fluoridated, e.g., in conventional municipal water treatment. However, the use of sodium monofluorophosphate in treating potable water sources in the amounts which have been described herein will be sufficient to provide a substantial fluoride content in the water. Thus, sodium monofluorophosphate treatment provides a substantial supplement to conventional fluoridation treatments and will therefore provide a considerable economic benefit to be derived from the reduction in the extent of such conventional fluoridation treatment which is required.

The manner of addition of any particular monofluorophosphate salt, especially the sodium monofluorophosphate, to an aqueous system, including a potable water source, will also be straightforward to a person of ordinary skill in this art. It may be added in finely subdivided solid form by mechanical dispensers of known design. It may also be added in solid form, but in the form of a matrix in which solid particles of the active ingredient are bonded or bound together by a material which is water soluble, or optionally, does not dissolve at all. Such a matrix allows for regular leaching out or dissolving of the active ingredient particles, whereby it is possible to obtain a sustained release and more unvarying concentration of the sodium monofluorophosphate in the water being treated. The particular monofluorophosphate salt, especially sodium monofluorophosphate, may also be made up in the form of concentrated solutions for dispensing in liquid form from dispensers well known in the art. Monofluorophosphate salts, especially sodium monofluorophosphate, may also be combined with other chemical treatment agents for dispensing to the aqueous system, including a potable water source; and these in combination may be dispensed in solid or liquid form.

The phrase "aqueous system" as used herein is meant to include any system containing water; including, but not limited to, cooling water systems including cooling towers, boiler water systems, desalination systems, gas scrubber units, blast furnaces, sewage sludge dewatering systems, thermal conditioning equipment, reverse osmosis units, sugar evaporators, paper processing systems, mining circuits, and the like.

Where the aqueous system is a potable water source, it may be any type of drinking water system or source. It may be as simple as a well supplying a single residence, the water of which is treated for the purpose of softening, etc., and there is then added to the chemical agents used in the water treatment, any particular monofluorophosphate salt, especially sodium monofluorophosphate, in accordance with the present invention. The same water softening treatment make also be taking place in the context of an individual dwelling, but one in which the source of the water is a municipal plant or a private water company. Again, however, all that may be necessary to carry out the methods of the present invention is to expand that existing treatment program with effective amounts of any particular monofluorophosphate salt, especially sodium monofluorophosphate, in accordance with the present invention.

The potable water source may be a major distribution system such as a municipal plant or a private water company. It is in such a setting that economies of scale can truly be realized, and it is in such a setting that the methods of the present invention find their preferred application.

EXAMPLES OF PREFERRED EMBODIMENTS

The following examples demonstrate the effectiveness of the treatment methods of the present invention in reducing lead solubility in water. These examples are illustrative only, and are not intended to be a limitation of the present invention.

EXAMPLE 1

Scale Inhibition

Experiments were performed to demonstrate the effectiveness of sodium monofluorophosphate in inhibiting the formation of calcium carbonate scale. In order to evaluate the effectiveness of sodium monofluorophosphate as a threshold inhibitor for calcium carbonate stabilization in the pH 8 range, supersaturated solutions of calcium bicarbonate/calcium carbonate were observed in the presence and absence of the inhibitor. In this test procedure, the supersaturated solutions were prepared by co-mixing sodium bicarbonate and calcium chloride solutions.

The pH of the supersaturated solution determines the ratio of the bicarbonate and carbonate present in the test solution. At pH 8.0, the ratio of the carbonate:bicarbonate is about 1:50, and the supersaturation level of the test solution is about 1.6–2.0×the equilibrium solubility. After 24 hours storage at 65° C., the equilibrium concentration is 250–300 mg/L as $CaCO_3$. The inhibitor effectiveness under these conditions is obtained by determination of the soluble calcium content of the test solutions using the Schwarzenbach titration method. (EDTA chrome black T indicator). Indirectly, this analytical technique reveals the calcium precipitated as calcium carbonate and allows a calculation of the percent of threshold inhibition.

The soluble calcium ion concentration in the absence of inhibitor is equivalent to 0% scale inhibition (normal $CaCO_3$ precipitation). The calcium ion concentration in the presence of sufficient inhibitor to maintain the theoretical concentration (no precipitation of calcium carbonate) is equivalent to 100% inhibition. Intermediate calcium ion concentrations represent intermediate levels of percent calcium carbonate inhibition.

PROCEDURE: To 470.1 ml of distilled water is added 4.9 ml of 1.0M $NaHCO_3$ with agitation, followed by 25.0 ml of 0.1M $CaCl_2 \cdot 2H_2O$ with agitation; pH should be 8.0–8.1. This is the control solution. The control solution is poured into a clean Erlenmeyer flask, stoppered, and placed in an oven or bath at 65° C. For inhibitor treated solutions, the same procedure is followed, adjusting the distilled water volume to compensate for the inhibitor volume. After 24 hrs storage at 65° C., the flasks are removed and a sample is taken for final pH determination. Then, 20 ml of filtered sample is pipeted into a porcelain dish and diluted to 50 ml with distilled water, immediately after which a Schwarzenbach titration is carried out. The number of mls of 0.01M EDTA solution required to change the solution color from red to clear blue is recorded ($V_E$). The percent inhibition is calculated in accordance with the following equation:

$$\frac{V_E - V_O}{V_T - V_O} \times 100 = \% \text{ Inhibition}$$

$V_O$ = the Schwarzenbach titration volume with no inhibitor present. (Control). Titration volume should be 5.0–6.0 ml (100–120 mg/L $Ca^{+2}$, 250–300 mg/L as $CaCO_3$) using a 20.0 ml sample.

$V_T$ = the Schwarzenbach titration volume when no precipitation occurs. Titration volume should be 10.0 ml (25 ml of 0.1M $CaCl_2 \cdot 2H_2O$ diluted to 500 ml with distilled water should be standardized to give a 10.0 ml Schwarzenbach titration on a 20 ml sample.) (200 ml/L $Ca^{+2}$, 500 mg/L as $CaCO_3$)

$V_E$ = the experimental Schwarzenbach titration volume when inhibitors are present in the test solution. Titration volumes will be between 5.0–10.0 ml using a 20 ml sample.

RESULTS: Following the above procedure and using sodium monofluorophosphate ($Na_2PO_3F$), the following results were obtained:

| | Conditions | | | |
| FLASH | ML INHIBITOR | ML DI WATER | INITIAL PH | FINAL PH |
| --- | --- | --- | --- | --- |
| A | 0.74 | 469.4 | 8.14 | 7.19 |
| B | 1.47 | 468.6 | 8.14 | 7.80 |
| C | 2.94 | 467.2 | 8.13 | 8.08 |
| D | 4.41 | 465.7 | 8.14 | 8.05 |
| E | 5.88 | 464.2 | 8.12 | 8.01 |
| F | 7.35 | 462.8 | 8.13 | 8.00 |
| Control | — | 470.1 | 8.13 | 6.89 |

| FLASK | AMOUNT (ML) 0.01 M EDTA | PERCENT INHI-BITION | CONC. MG/L Na$_2$PO$_3$F | AS PO$_3$F |
|---|---|---|---|---|
| A | 7.2 | 37.78 | 0.74 | 0.5 |
| B | 9.6 | 91.11 | 1.47 | 1.0 |
| C | 10.0 | 100.00 | 2.94 | 2.0 |
| D | 10.0 | 100.00 | 4.41 | 3.0 |
| E | 10.0 | 100.00 | 5.88 | 4.0 |
| F | 10.0 | 100.00 | 7.35 | 5.0 |
| Control | 5.5 | — | — | — |

EXAMPLE 2

MANGANESE STABILIZATION

PROCEDURE: Conditions: room temperature; 4.0 hours @ 60 rpm; pH 8.0; $[Mn^{+2}]_i = 2.00$ mg/L.

Into a 1000 mL beaker there is weighed 998.00 grams of room temperature, 1×Pittsburgh water and then a pH electrode is immersed into the water and stirring is begun at medium speed. There is then added five drops of Clorox ® (5.25% OCl⁻). Using a 2.00 mL volumetric pipet, 2.00 mL of 1.00 g/L Mn$^{+2}$ stock solution is pipeted under the surface of the water. (The Mn$^{+2}$ stock solution is prepared using 4.125 mL per liter of Fisher Chemical M-97, 50% Manganous Nitrate, which equals 3.257 g/L of Mn(NO$_3$)$_2$.) The pH is adjusted to 8.0 using 0.050M NaOH. The solution is next placed under a gang stirrer and agitated at 60 rpm for four (4) hours. This solution serves as the control. The inhibited solutions are prepared similarly, adjusting the water volume to account for the inhibitor volume. Inhibitor stock solution is added immediately after the first step above. After 4 hours, the samples are filtered through Whatman 41 filter paper (25 microns). For each sample, 100 mL of filtrate is acidified with 0.500 mL concentrated HNO$_3$. Next, 2.00 mL of Mn$^{+2}$ stock dilution is diluted to 1000 mL with distilled water and stirred, after which 100 mL of this solution is acidified with 0.500 mL of concentrated HNO$_3$. The acidified filtrates and diluted Mn$^{+2}$ stock solution are then analyzed using atomic absorption spectroscopy. The percent (%) stabilization is calculated as follows:

$$\frac{\text{mg/L Mn}^{+2} \text{ Test Solution} - \text{mg/L Mn}^{+2} \text{ Control}}{\text{mg/L Mn}^{+2} \text{ Initial Solution} - \text{mg/L Mn}^{+2} \text{ Control}} \times 100$$

RESULTS: Following the above procedure and using sodium monofluorophosphate (Na$_2$PO$_3$F), the following results were obtained:

| FLASK | Conditions ML INHIBITOR | ML 1X WATER | INITIAL PH |
|---|---|---|---|
| A | 2.94 | 995.1 | 8.37 |
| B | 3.68 | 994.3 | 8.41 |
| C | 4.41 | 993.6 | 8.34 |
| D | 5.15 | 992.9 | 8.36 |
| E | 5.88 | 992.1 | 8.40 |
| Control | — | 998.0 | 8.51 |

| FLASK | Test Results MG/L Mn$^{2+}$ TEST SOLUTION 4 HRS. | 24 HRS. | % STABILIZATION 4 HRS. | 24 HRS. | CONC. MG/L Na$_2$PO$_3$F | AS PO$_3$F |
|---|---|---|---|---|---|---|
| A | 2.04 | 1.46 | 100.51 | 69.80 | 2.94 | 2.0 |
| B | 2.08 | 1.23 | 100.51 | 58.42 | 3.68 | 2.5 |
| C | 2.10 | 1.74 | 101.52 | 83.66 | 4.41 | 3.0 |
| D | 2.05 | 1.47 | 98.98 | 70.30 | 5.15 | 3.5 |
| E | 2.03 | 1.11 | 97.97 | 52.48 | 5.88 | 4.0 |

Initial: 2.07 mg/L Mn$^{2+}$
Control: 0.10 mg/L Mn$^{2+}$ (4 hrs.) 0.05 mg/L Mn$^{2+}$ (24 hrs.)

EXAMPLE 3

Iron Stabilization

PROCEDURE: Conditions: room temperature; 2 hours @ 20 rpm; pH 7-7.2; $[Fe^{+2}]_i = 2.00$ mg/L.

Into a 1000 mL beaker there is weighed 996.00 grams of room temperature, 1×Pittsburgh water, and a pH electrode is then immersed into the water and stirring is begun at medium speed. Then, 1.50 mL of 1.00M NaHCO$_3$ is pipeted into the water, after which 0.400 mL of 1.00M NaOH is pipeted into the water using a micropipeter. Using a 2.00 mL volumetric pipet, 2.00 mL of 1.00 g/L Fe$^{+2}$ stock solution is pipeted under the surface of the water. (The Fe$^{+2}$ stock solution is prepared fresh using 7.02 grams of Fe(NH$_4$)$_2$(SO$_4$)$_2$ · 6H$_2$O and 10.0 mL of concentrated H$_2$SO$_4$ per total volume of 1.00 liter.) When the pH stabilizes (<5 minutes), the pH electrode is removed. The solution is then placed under a gang stirrer and agitated at 20 rpm for two (2) hours. This solution serves as the control. The inhibited solutions are prepared similarly, adjusting the water volume to account for the inhibitor volume. Inhibitor stock solution is added immediately after the first step above. After 2 hours, the samples are filtered through Whatman 41 filter paper (25 microns). For each sample, 50 mL of filtrate are acidified with 2.50 mL concentrated HCl. Next, 2.00 mL of Fe$^{+2}$ stock solution is diluted to 100 mL with distilled water and stirred, after which 50 mL of this solution is acidified with 2.50 mL of concentrated HCl. The acidified filtrates and diluted Fe$^{+2}$ stock solution are then analyzed using atomic absorption spectroscopy. The values are multiplied by 1.05 to account for dilution during acidification. The percent (%) stabilization is calculated as follows:

$$\frac{\text{mg/L Fe}^{+2} \text{ Test Solution} - \text{mg/L Fe}^{+2} \text{ Control}}{\text{mg/L Fe}^{+2} \text{ Initial Solution} - \text{mg/L Fe}^{+2} \text{ Control}} \times 100$$

RESULTS: Following the above procedure and using sodium monofluorophosphate (Na$_2$PO$_3$F), the following results were obtained:

| FLASK | Conditions ML INHIBITOR | ML 1X WATER | INITIAL PH |
|---|---|---|---|
| A | 7.35 | 988.75 | 7.14 |
| B | 14.71 | 981.39 | 7.09 |
| C | 22.06 | 974.04 | 7.05 |
| D | 29.41 | 966.69 | 7.10 |
| E | 36.76 | 959.34 | 7.07 |
| Control | — | 996.10 | 7.01 |

| | Test Results | | CONC. MG/L AS | |
|---|---|---|---|---|
| FLASK | MG/L Fe$^{2+}$ TEST SOLUTION | % STABILIZATION | Na$_2$PO$_3$F | PO$_3$F |
| A | 1.44 | 74.73 | 7.35 | 5.0 |
| B | 1.42 | 73.66 | 14.71 | 10.0 |
| C | 1.52 | 79.03 | 22.06 | 15.0 |
| D | 1.49 | 77.42 | 29.41 | 20.0 |
| E | 1.56 | 81.18 | 36.76 | 25.0 |

Initial: 1.91 mg/L Fe$^{2+}$
Control: 0.05 mg/L Fe$^{2+}$

What is claimed is:

1. A method of inhibiting calcium carbonate scale formation in an aqueous system comprising the step of treating said system with an effective scale-inhibiting amount of a monofluorophosphate salt.

2. The method of claim 1 wherein sodium monofluorophosphate is used in an amount sufficient to achieve a concentration of from 0.1 to 50 mg/L in said aqueous system.

3. The method of claim 2 wherein the concentration of sodium monofluorophosphate is from 1.0 to 10 mg/L.

4. The method of claim 2 wherein the concentration of sodium monofluorophosphate is from 2 to 5 mg/L.

5. A method of inhibiting the precipitation of dissolved manganese ion and its reaction products in an aqueous system, comprising the step of treating said system with an effective precipitation-inhibiting amount of a monofluorophosphate salt.

6. The method of claim 5 wherein sodium monofluorophosphate is used in an amount sufficient to achieve a concentration of from 0.1 to 50 mg/L in said aqueous system.

7. The method of claim 6 wherein the concentration of sodium monofluorophosphate is from 1.0 to 10 mg/L.

8. The method of claim 6 wherein the concentration of sodium monofluorophosphate is from 2 to 5 mg/L.

9. A method of inhibiting the precipitation of dissolved iron ion and its reaction products in an aqueous system, comprising the step of treating said system with an effective precipitation-inhibiting amount of a monofluorophosphate salt.

10. The method of claim 9 wherein sodium monofluorophosphate is used in an amount sufficient to achieve a concentration of from 1 to 500 mg/L in said aqueous system.

11. The method of claim 10 wherein the concentration of sodium monofluorophosphate is from 2 to 100 mg/L.

12. The method of claim 11 wherein the concentration of sodium monofluorophosphate is from 5 to 50 mg/L.

* * * * *